US004001757B2

United States Statutory Invention Registration [19]

[11] Reg. Number: H1757

Seltzer [45] Published: Nov. 3, 1998

[54] METHOD AND APPARATUS FOR AUTOMATED ISOKINETIC SAMPLING OF COMBUSTOR FLUE GASES FOR CONTINUOUS MONITORING OF HAZARDOUS METAL EMISSIONS

[76] Inventor: Michael D. Seltzer, 1140 Denise Ave., Ridgecrest, Calif. 93555

[21] Appl. No.: 932,401

[22] Filed: Sep. 17, 1997

[51] Int. Cl.[6] ..... G01M 1/00

[52] U.S. Cl. ..... 73/863

[58] Field of Search ..... 73/28.01, 863.01, 73/863.02, 863.03, 863.11, 863.12, 863.83

[56] References Cited

U.S. PATENT DOCUMENTS

| | | | |
|---|---|---|---|
| Re. 29,304 | 7/1977 | Greenfield et al. . | |
| 3,784,902 | 1/1974 | Huber | 73/863.03 |
| 3,965,747 | 6/1976 | McCorkle . | |
| 3,965,748 | 6/1976 | Boubel et al. . | |
| 4,091,835 | 5/1978 | Frampton . | |
| 4,159,635 | 7/1979 | Sehmel . | |
| 4,293,220 | 10/1981 | Denton et al. . | |
| 4,390,772 | 6/1983 | Hiratake . | |
| 4,479,379 | 10/1984 | Tarcy | 73/19.07 |
| 4,482,246 | 11/1984 | Meyer et al. . | |
| 4,566,342 | 1/1986 | Kurz . | |

(List continued on next page.)

OTHER PUBLICATIONS

J.D. Chase Theoretical and Experimental Investigation of Pressure and Flow in Induction Plasmas, Journal of Applied Physics. Nov. 1971 vol. 42, No. 12, pp. 4870–4879.

(List continued on next page.)

*Primary Examiner*—Charles Jordan
*Assistant Examiner*—Meena Chelliah

[57] ABSTRACT

An isokinetic sampling system and method of operation assures the taking of more valid data over a long period by automated isokinetic sampling of flue gases in the stack for a stationary combustor. Sample air is extracted from the flue gases by a sampling probe having a sampling nozzle of a precise inner diameter, a thermocouple to measure the air temperature in the stack, and a pitot tube that gives readings representative of differential pressure across sampling nozzle. A separate transducer senses absolute pressure of the flue gases. Temperatures, absolute pressures and differential pressures of the flue gases are measured and representations of the temperatures, absolute pressures and differential pressures are fed to a micromanometer which feeds signals representative of these representations to a computer that generates responsive control signals for a mass flow controller. The mass flow controller throttles the flow of sample air through it to a correct magnitude to achieve isokinetic extraction of sample air under the existing stack conditions of temperature, pressure, and velocity at the point of extraction at the sample nozzle for the selected nozzle opening, or diameter. Stack conditions can vary over time and this automated isokinetic sampling system immediately adjusts the flow rate of mass flow controller so that isokinetic sampling continues uninterrupted and valid data can be generated by monitoring sensors.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 4,649,760 | 3/1987 | Wedding . | |
| 4,739,147 | 4/1988 | Meyer et al. . | |
| 5,012,065 | 4/1991 | Rayson et al. . | |
| 5,090,257 | 2/1992 | Bruce . | |
| 5,479,254 | 12/1995 | Woskov et al. . | |
| 5,526,110 | 6/1996 | Braymen . | |
| 5,635,652 | 6/1997 | Beaudin | 73/863.03 |

OTHER PUBLICATIONS

D. Truitt & J.E.Robinson Spectoscopic Studies of Organic Compounds Introduced into a Radio Frequency Induced Plasma. Analytica Chemica Acta, 51–1970 pp. 61–67 Elsevier Publishing Company, Amsterdam.

Seltzer, Michael D. An Argon ICP–Based Continous Emissions Monitor for Hazardous air Pollutant Metals: Field Demonstration Presentation of the Ari Waste Management Association. 90$^{th}$ Annual Management Exhibition, Jun. 1997.

Seltzer, Michael D. An Inductively Coupled Argon Plasma Continuous Emissions Monitor forHazardous Air Pollutant Metals, Enviromental Science and Technology Sep. 1997. Submitted Apr. 1997.

Seltzer, Michael D & Gerhard A. Meyer, Keeping and Eye on Metals Emmissions, Enviromental Protection, Jun. 1997 vol. 8, No. 6—pp. 26–29.

Seltzer, Michael D. Continous Air Monitoring Using Inductively Coupled Plasma, Applied Spectorscopy, Submitted Jun. 1997.

Emmisions Measurement Branch, nsps Test Method, EMTIC M–002 Technical Support Division, OAQPS, EPA, NAWS China Lake.

METHOD AND APPARATUS FOR AUTOMATED ISOKINETIC SAMPLING OF COMBUSTOR FLUE GASES FOR CONTINUOUS MONITORING OF HAZARDOUS METAL EMISSIONS

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This is a continuation in part of copending U.S. patent applications entitled "Modified Plasma Torch Design for Introducing Sample Air into Inductively Coupled Plasma" by Michael Seltzer, U.S. Patent and Trademark Office application Ser. No. 08/932,397, filed Sep. 17, 1997, "Sampling Interface for Continuous Monitoring of Emissions" by Michael Seltzer, U.S. Patent and Trademark Office application Ser. No. 08/932,233, filed Sep. 17, 1997 and "Correction of Spectral Interferences Arising from CN Emission in Continuous Air Monitoring Using Inductively Coupled Plasma Atomic Emission Spectrometry" by Michael Seltzer, U.S. Patent and Trademark Office application Ser. No. 08/932,023, filed Sep. 17, 1997 and incorporates all references and information thereof by reference herein.

BACKGROUND OF THE INVENTION

This invention relates to a method and apparatus for sampling flue gases for an emissions monitor. In particular, this invention relates to a method and apparatus for automated and continuous isokinetic sampling of combustor gases that collects the samples at elevated flow rates and pneumatically transports the samples to a continuous emissions monitor.

The validity of information derived from sampling combustor gases has improved due to the recent advances set out in U.S. Pat. No. 5,596,405 and the other above referenced applications. U.S. Pat. No. 5,596,405 describes a method and apparatus for continuous monitoring of toxic airborne metals in the flue gases of waste combustors and other stationary sources. A stream of sample air extracted from the exhaust stack of the stationary source is introduced into an inductively coupled argon plasma (ICAP) spectrometer and entrained metal aerosols are detected by means of atomic emission spectrometry. This patented invention represents an adjunct to, or, rather, a replacement for manual methods of testing that requires captive sampling of airborne particulate matter and subsequent spectrochemical analysis later. These manual methods include U.S. Environmental Protection Agency Methods 5 and 29, and SW-846 Method 0060. See, EPA Test Method 2—"Determination of Stack Gas Velocity and Volumetric Flow Rate (Type S Pitot Tube)," and EPA Test Method 29—"Determination of Metals Emissions from Stationary Sources," 40 CFR 60, Appendix A, U.S. Government Printing Office, Washington, D.C.

When using these manual methods, however, an issue regarding the accuracy and validity of data arises. A sample air stream is extracted from the moving stream of flue gases in the exhaust stack. This stream of sample air may not contain a truly representative composition in terms of particle size and mass. The entrained particulate matter in flue gases, often consists of fly ash generated by the combustion of solid wastes, coal, or other fuels (which may include solid or liquid wastes). Consequently, the entrained particulates may vary considerably in chemical composition, and the variance may be particle size dependent. Therefore, it is essential that all particle sizes be extracted with equal efficiency with minimum bias toward either large or small particles.

In the EPA methods listed above for manual testing of stack emissions, a filter assembly is usually mounted at the opposite end of the sample probe from the nozzle to collect particulate matter entrained in the extracted stream of sample air. A vacuum is applied from a source to the downstream side of the filter assembly to create the desired flow of sample air through the nozzle, probe, and filter. The flow is maintained for a finite period during which particulate matter is allowed to accumulate on the filter. Later, the filter is chemically digested and the metal residues recovered from the filter are spectrochemically analyzed. The total mass collected of each metal element is determined and divided by the total volume of air extracted during the finite period to calculate a concentration in mass per unit volume.

In contradistinction, the continuous emissions monitors of the cited patent and cross referenced applications differ from the manual approach in that the filter assembly is eliminated and the extracted stream of sample air is transported or propelled under vacuum through an appropriate transfer line consisting of heated and insulated Teflon tubing to prevent condensation of flue gas moisture. From the tubing, the sample air stream passes to an elemental analyzer, an ICAP spectrometer. Contrary to the manual methods, the entrained particulate matter is not captured for later analysis, but it is introduced directly into the argon plasma where it is vaporized and the metals are excited to emit light according to the principles of atomic emission spectrometry. One of the keys to the success of this specific process is the sampling interface described in U.S. Pat. No. 5,596,405 and other cross referenced applications.

Traditionally, isokinetic sampling of flue gas streams for the manual methods described above has been accomplished by strictly manual means. Typically, manual measurements of flue gas velocity are made using pitot tubes, mounted on the sampling probe. The operator periodically reads a device called an incline manometer to obtain the differential pressure from the pitot tube assembly. Then, the flue gas velocity is calculated using this and other manually-obtained parameters such as gas temperature, absolute pressure, and molecular weight. The gas temperature, absolute pressure, and molecular weight define the density of the flue gas which is required to relate the differential pressure measurement to the actual linear velocity of the flue gases. Once the flue gas velocity is known, the operator calculates and then manually adjusts the flow of the extracted sample air stream to achieve linear velocity in the sampling nozzle that is identical to that of the adjacent flue gases. This process is repeated, as necessary, during the duration of the sample collection process. The goal is to maintain agreement between the two velocities within ±10 percent which is considered satisfactory for achieving isokinetic conditions.

Recently, a commercial system was introduced, that automates many of the manual functions described above. This system is manufactured by Graseby-Andersen (Smyrna, Ga.) and is specifically configured to perform EPA Methods 5&29. The design of this system will not adequately support or perform the invention to be described below which is for continuous emissions monitoring of toxic airborne metals, nor is it otherwise amenable to modifications aimed at achieving the desired function of this invention.

In other words, while the manual approach described above for achieving isokinetic sampling is entirely compatible with the manual methods of stack testing also described above, it does not adequately support the continuous emissions monitoring approach of the present invention to be elaborated on below. This is because the laborious, speculative, and disjunctive steps of the manual methods are not consistent with the automated nature of the continuous emissions monitoring process associated with this invention.

Thus, in accordance with this inventive concept, a need has been recognized in the state of the art for a means for automatically and continuously extracting, under isokinetic conditions, a stream of sample air for continuous measurement of airborne metal concentrations in the flue gases of waste combustors and other stationary sources, and a further need has been recognized for an arrangement of hardware and software that continuously extracts a stream of sample air from a combustor stack under strictly isokinetic conditions without human adjustment or vigilance.

SUMMARY OF THE INVENTION

The present invention is directed to providing a method of and apparatus for automated isokinetic sampling of flue gases for a continuous monitor of metal emissions. Extracting sample air from the flue gases in an exhaust stack for a combustor with a heated sampling probe allows for measuring temperatures, absolute pressures and differential pressures of the flue gases. Feeding signals representative of the temperatures, absolute pressures and differential pressures to a computer assures a generating of control signals in the computer based on the representative signals for a mass flow controller. The control signals are used for controlling the mass flow controller to affect the flow of the sample air through the heated sampling probe. The apparatus includes means for extracting sample air from the flue gases in an exhaust stack for a combustor with a heated sampling probe. Means for measuring temperatures, absolute pressures and differential pressures of the flue gases provided representative signals. Means for feeding the signals representative of the temperatures, absolute pressures and differential pressures to a computer assures that the computer generates control signals based on the representative signals, for a mass flow controller. The control signals are used for controlling the mass flow controller to affect the flow of the sample air through the heated sampling probe. The method and apparatus thereby achieve isokinetic extraction of the sample air under the existing stack conditions of temperature, pressure, and velocity at the point of extraction of the sample air.

An object of the invention is to provide automated isokinetic sampling for continuous emissions monitoring.

An object of the invention is to provide automated isokinetic sampling for continuous emissions monitoring of combustor gases.

Another object of the invention is to provide automated isokinetic sampling that collects and transports the stream of sample air through heated conduit and sampling interface.

Another object of the invention is to provide automated isokinetic sampling in the first system that collects and transports streams of sample air containing airborne particulate matter for analysis.

Another object of the invention is to provide automated isokinetic sampling in the first system of an emerging technology that continuously monitors airborne emissions of metals for prolonged periods.

Another object of the invention is to provide automated isokinetic sampling that collects and transports sample air with minimal losses of entrained particulate matter.

Another object of the invention is to provide isokinetic sampling using a computer along with a custom-written software program to automate all aspects of the isokinetic sampling process.

Another object of the invention is to provide isokinetic sampling air from a moving stream of flue gas that is conducted in an automated manner on a continuous basis rather than for short durations.

Another object of the invention is to provide automated isokinetic sampling that extracts sample air at elevated flow rates to ensure efficient pneumatic transport through a line for transferring the sample air.

Another object of the invention is to provide automated isokinetic sampling that extracts sample air at elevated flow rates up to 40 liters per minute and greater to ensure efficient pneumatic transport through a line for transferring the sample air that may exceed lengths of 30 meters.

Another object of the invention is to provide automated isokinetic sampling designed expressly for use in conjunction with a continuous emissions monitor for toxic airborne metals.

Another object of the invention is to provide automated isokinetic sampling in which a mass flow controller is located on the downstream side of a vacuum pump to throttle the flow of sample air.

These and other objects of the invention will become more readily apparent from the ensuing specification when taken in conjunction with the appended claims.

DESCRIPTION OF THE PREFERRED EMBODIMENTS

Figure 1:
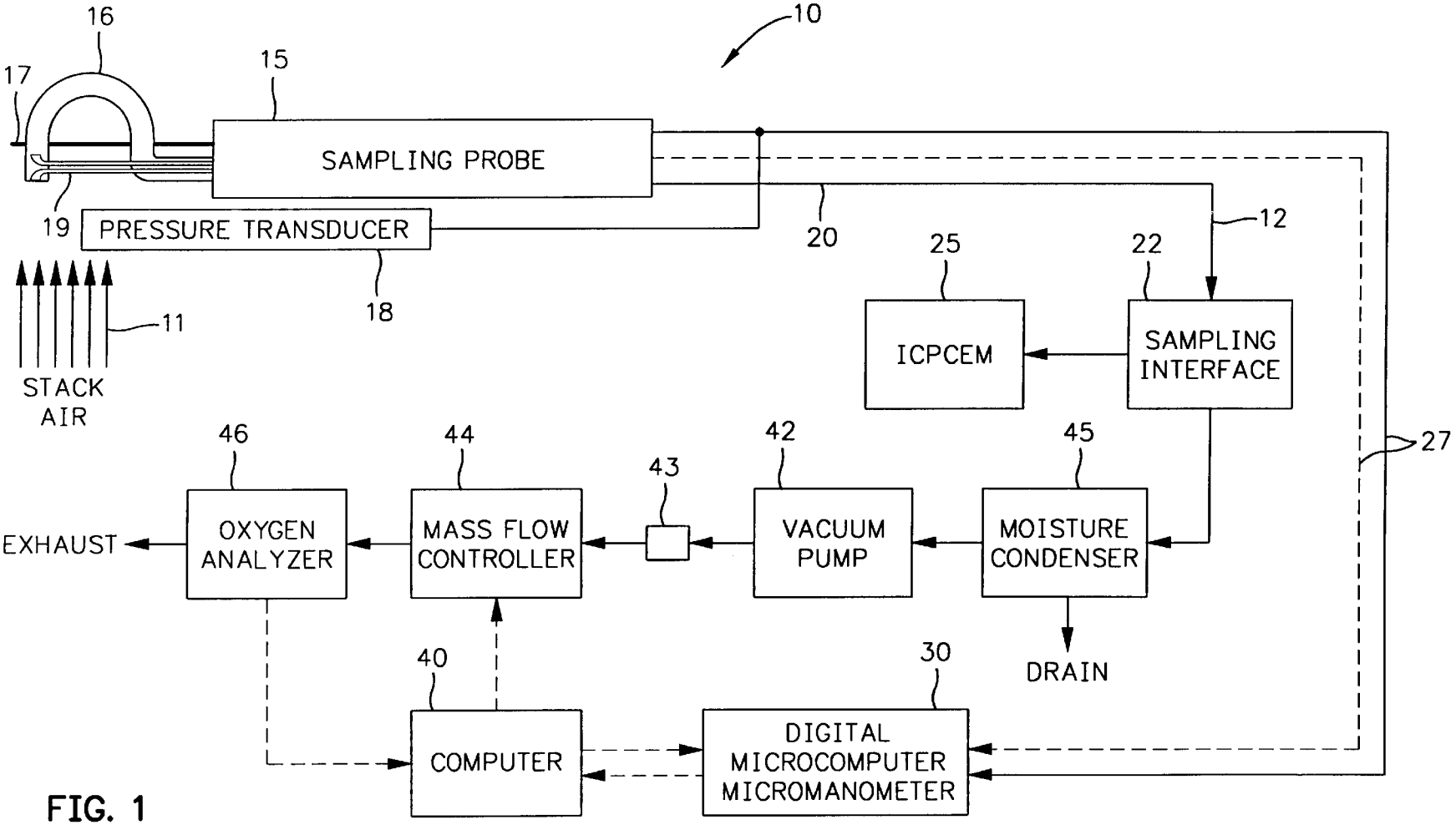
FIG. 1 is a block diagram of the automated isokinetic sampling system according to this invention as configured for continuous emissions monitoring of toxic airborne metals.

Referring to FIG. 1 of the drawings, one important feature of automated isokinetic sampling system 10 of this invention is that it automates the isokinetic sampling of flue gases 11 emitted from a combustor, such as a waste incinerator, cement kiln, etc. The isokinetic sampling, as provided for in this invention, is not only automated, but is also continuous for prolonged periods. This assures reliable monitoring of emissions of toxic airborne metals in flue gases without requiring a human operator present.

As realized in the practice of this invention and what is generally understood and accepted, the sampling procedure for sampling air from a moving stream can and does affect the findings of a later analysis. This is particularly true when sample air is taken from a moving stream of flue gases in a stack of a stationary combustor and an analysis is performed to determine the entrained constituents of the gases. The validity of the sampling process can be enhanced when the sample air is extracted from the stream of flue gases under a set of conditions referred to as isokinetic conditions.

Isokinetic conditions are those in which the linear velocity of the extracted air is exactly identical to that of the adjacent flue gas stream from which the sample air is extracted. Under isokinetic sampling conditions, particulate matter is entrained in the moving flue gas stream and follows essentially linear paths parallel to the flow of flue gases. A portion, or sample, of the particulate matter can be collected by extracting a slipstream of the flue gases at a selected point in the exhaust stack. This collection is accomplished by positioning a sampling probe at the selected point. The sampling probe having a nozzle, consisting of thin-walled tubing, of specific inner diameter is mounted, such that the plane of its orifice is oriented to be exactly perpendicular to the direction of the flow of flue gases. A vacuum of appropriate magnitude is maintained at the opposite end of the sampling probe to induce flue gases to enter the nozzle and probe. The magnitude of the vacuum and hence, the volumetric flow rate (in volume per unit time) is adjustable. This adjustment assures that the linear velocity (distance per unit time) of extracted air moving through the cross-sectional area defined by the nozzle orifice exactly matches the linear velocity of the adjacent flue gas stream. This process is called isokinetic sampling.

Particulate matter following essentially linear paths that are intercepted by the orifice of the sampling nozzle is thus collected. Particulate matter following essentially linear paths that are not intercepted by the orifice is not collected. Since the stream of extracted sample air has a linear velocity identical to that of the moving flue gas stream, particulate matter moving in paths not intercepted by the orifice of the sampling nozzle will not be drawn into or otherwise induced to cross streamlines to enter the nozzle. Such drawing-in or inducing might be the case in which the sample extraction velocity exceeds the velocity of the moving flue gas stream.

Thus, in accordance with this inventive concept, certain parameters must be identified and established to satisfactorily incorporate the features of automated isokinetic sampling of this invention. In operational terms, isokinetic sampling requires direct measurement of temperature, pressure, and velocity of the flue gas, calculation of the appropriate flow rate that sample air is extracted to achieve the linear velocity that is necessary through the nozzle for the sampled air, and adjusting the flow rate of the sampling accordingly. Hardware provisions have been made to accomplish each of these tasks in a facile manner.

The advantage of isokinetic sampling is apparent when sampling is done in its absence. One of the first things that is noticed is that the collected or extracted stream of sample air may not be representative of the flue gas stream under examination. For example, in the case mentioned above where the sample extraction velocity exceeds the velocity of the moving flue gas stream, particles moving in paths not directly intercepted by the nozzle orifice are induced to cross stream lines to enter the nozzle. This is because of the pressure differential between the gases inside and adjacent to the nozzle. Since particles of different masses and hence, different momenta are affected differently, all the particles may not cross the streamlines with equal ease. In actuality, the larger particle has larger linear momentum and inertia in the flue gas stream. Thus, there is a decreased likelihood that the larger particles will change directions and cross streamlines to enter the nozzle as easily as smaller, less massive particles can. Consequently, the sample air extracted from the stream will become artificially enriched in smaller particulates. This introduces an appreciable measurement bias, based on the assumption that the chemical composition of the particulates varies with size of the particles which is often the case with the particulate matter associated with fly ash.

An automated isokinetic sampling system in accordance with this invention performs the functions of a human operator but around-the-clock. In addition, it is continuously and constantly vigilant and, perhaps, makes more frequent adjustments. Thus, isokinetic conditions might be maintained closer to 100 percent for a greater percentage of the time than might be achievable with manual observations and adjustments as practiced in the prior art. It is understood that the closer the isokinetic conditions can approach 100 percent, for a maximum fraction of the time, the measurement of particulates becomes of corresponding higher quality. This feature is particularly critical in the present application since the process of this invention is intended to operate continuously rather than for the relatively short periods of 1–3 hours. These relatively short periods are customary using the methods of manually testing gases from stacks set out in EPA Methods 5 and 29.

Furthermore, the isokinetic extractions of sample air called for by the present invention are carried out at considerably higher flow rates of gas than the typical flow rates used in the methods of manual testing in EPA Methods 5 and 29. The higher flow rates are used in this invention to promote adequate transport velocity through the length of transfer line extending between the sampling probe and the inlet port of the sampling interface mounted adjacent to the elemental analyzer (ICAP). The length of the transfer line may exceed 30 meters sometimes, and failure to maximize the velocity of the sample air stream through this conduit may result in losses of airborne particulates that are attributed to inadvertent depositing or settling of the airborne particulates. In order to minimize these losses, flow rates of extracted sample air as high as 20–40 liters per minute may be required. This produces transport velocities of the sample air between 4–8 meters per second through a conduit of 1 centimeter inner diameter, for example.

Automated isokinetic sampling system 10 includes heated sampling probe 15. A typical heated sampling probe 15 that could be selected is marketed by Clean Air Engineering of Palatine, Ill. Sampling probe 15 has a sampling nozzle 16 mounted on its end. Sampling nozzle 16 is disposed to receive isokinetic air samples 12 from flue gases 11 in a stack of a combustor and has a precise inner diameter. A sampling nozzle may be selected, for example, from a stainless steel or glass set of nozzles having inner diameters of 3/16", 1/4", 5/16", 3/8", 7/16", and 1/2" that is marketed by Clean Air Engineering of Palatine, Ill.

Sampling probe 15 also is provided with probe thermocouple 17 for flue gas temperature measurement. A suitable thermocouple is marketed by Clean Air Engineering of Palatine, Ill. A signal conditioner that may be provided in components to be described or disposed within probe 15 is coupled to thermocouple 17 to convert output of thermocouple 17 to voltage or current as required by interconnected elements. A separate pressure transducer 18 communicates with the flue gas 11 for determining the absolute pressure of flue gas 11 and an S-type pitot tube assembly 19 in probe 15 is disposed in stack air, or flue gas, 11 to measure flue gas differential pressure. A suitable pitot tube is marketed by Clean Air Engineering of Palatine, Ill. A signal conditioner may be provided in components to be described to convert output of pressure transducer 18 to voltage or current. A heated sample transfer line 20 marketed by Technical Heaters of San Fernando, Calif. transports extracted a stream of sample air 12 from sampling probe 15 through sampling interface 22 to the elemental analyzer 25, an inductively coupled argon plasma spectrometer (ICAP).

Microprocessor micromanometer 30 is included to function as a differential pressure measuring device. Typically, microprocessor micromanometer 30 could be a model FC0510 marketed by Furness Controls of Charlotte, N.C. or an equivalent unit. Umbilical assembly 27 is multipurpose and has plastic tubing that connects pitot tubes 19 to micromanometer 30, thermocouple extension cables, or conductors, that extend to thermocouple 17, conductors for connecting pressure transducer 18 to its signal conditioner, and conductors from an electrical power source, not shown, for heating probe 15. An appropriate umbilical assembly is marketed by Clean Air Engineering of Palatine, Ill. Computer controller 40 is equipped with serial data interface, analog-to-digital converter, and digital-to-analog converter for responsive operation of its interconnected elements as will be elaborated on below. Vacuum pump 42 is coupled to mass flow controller 44 via pressure regulator 43. Mass flow controller 44 controls the flow of gas between 0–40 liters per minute and may be a model 1259, marketed by MKS Instruments of Andover, Mass. Moisture removal from the extracted flue gases occurs in condenser 45 which is coupled to sampling interface 22. Sampling interface can be one of the interfaces described in U.S. Pat. No. 5,596,405.

A thermocouple, not shown, is included at the output of sampling interface 22 to measure the temperature of sample air 12 exiting sampling interface 22. A suitable signal conditioner could be provided to receive the output of this thermocouple to convert its output to an appropriate voltage or current for elements in computer 40 or as other interconnected elements may require. In addition, a pressure transducer for measuring and recording pressure of sample air exiting sampling interface 22 might also be provided and a signal conditioner is included to convert output of this pressure transducer to an appropriate voltage or current for elements in computer 40 or as other interconnected elements may require.

An automation program is written using appropriate software for computer 40. This program controls all functions of these elements of automated isokinetic sampling system 10. The sampling probe is positioned appropriately in the flue gas exhaust stack and secured. An isokinetic sampling nozzle is mounted on the end of the probe before insertion into the stack. A nozzle of specific diameter is selected in accordance with known or estimated stack velocity values. These are such that the required flow rate of extracted sample air will occur between 15 and 30 liters per minute in order to achieve strictly isokinetic extraction and at the same time, maximize the sample air velocity through the sample transfer line.

Digital microprocessor micromanometer 30, or equivalent device, acquires signals representative of a measurement of flue gas differential pressure via S-type pitot tubes 19 mounted on the end of sampling probe 15 next to sampling nozzle 16. Micromanometer 30 is configured to integrate the differential pressure signals for several seconds to minimize noisy readings. Micromanometer 30 also has the capability for acquiring both the signals representative of temperature of the flue gas from thermocouple 17 and the signals representative of absolute pressure of the flue gas from transducer 18 from their respective signal conditioners which may be at or be integrated with the component parts of micromanometer 30.

Computer controller 40 that provides automated switching sequences for system 10 employs various software packages that are appropriately implemented by one of ordinary skill to perform the switching sequences herein described. One of these software packages, is referred to as Thermospec™ Command Language which automates the sequencing of introduction of isokinetic samples 12 and measurement for inductively coupled plasma continuous emissions monitor (ICPCEM) 25. Prior to each measurement at approximately 60 second intervals, the Thermospec™ Command Language causes a separate program, written in compiled BASIC language, to execute. These software packages are described in greater detail in the cross referenced applications referred to above.

This BASIC program enables computer 40 to establish serial communication with microprocessor micromanometer 30 resulting in transfer of data to computer 40. This data includes the temperature, absolute pressure, and differential pressure readings from the appropriate sensors, thermocouple 17, transducer 18 and S-type pitot tube 19 of sampling probe 15 in flue gases 11. Using these parameters in addition to user-provided values of flue gas molecular weight and a coefficient (0.84) characteristic of S-type pitot tube 16, the BASIC program calculates the linear velocity of the flue gas using the following equation which is described in EPA Method 2:

$$V_s=85.48*C_p*(\Delta P)^{0.5}*(T_s/P_sM_s)^{0.5}$$

where:

$V_s$=flue gas velocity (feet per second)

$C_p$=unitless pitot coefficient $\Delta P$=pitot differential pressure (inches of water)

$T^s$=flue gas temperature (° Rankine)

$P_s$=flue gas absolute pressure (inches of mercury)

$M_s$=flue gas molecular weight 85.48=constant

Having calculated the flue gas velocity, the BASIC program proceeds to calculate the flow rate of extracted sample air required to achieve the necessary velocity, through sampling nozzle 16, having a specific cross-sectional area, to exactly match the velocity of the flue gases adjacent to the nozzle and thus provide isokinetic conditions. Prior to operation, the cross-sectional area of nozzle 16 in use is entered as a parameter along with other parameters into a user written data file that is subsequently read by the BASIC program. The flow rate of extracted sample air is calculated using the following equation:

$$R=\frac{1699 * V_s * T_{std} * P_{abs} * A_n * (1-B_w)}{T_s * P_{std}}$$

where:

R=Volumetric sampling rate for 100 percent isokinetic ($liter_{std}$/min)

$V_s$=flue gas velocity (ft/sec)

$T_{std}$=standard temperature (530° R)

$P_{asb}$=absolute flue gas pressure (inches mercury)

$A_n$=cross sectional area of nozzle ($ft^2$)

$B_w$=mole fraction of flue gas water content $T_s$=flue gas temperature (°R)

$P_{std}$=standard pressure (29.92 inches mercury)

1699=constant

To achieve the desired flow rate of extraction of sample air, mass flow controller 44 is mounted on the downstream side of vacuum pump 42 used to apply a vacuum, or suction, on the entire sampling system. Mass flow controller 44 throttles the flow of air exiting vacuum pump 42, and hence, the flow rate in the entire system which includes sampling interface 22, probe 15, and heated transfer line 20. Mass flow controller 44 senses the mass flow of a gas and precisely adjusts an internal metering valve to achieve the desired mass flow. Mass flow controller 44 is calibrated at the factory at dry standard conditions (70° F. and 29.29 inches of mercury pressure) and can be used to accurately select the sample air flow rate regardless of the temperature and pressure of the sample air. The selection of a particular flow rate (in standard liters per minute) by mass flow controller 44 ensures that the correct velocity of sample air will be achieved even though the temperature and pressure of the flue gases are somewhat different from standard conditions.

The throttling action of the mass flow controller 44 is adjusted by applying a set-point voltage between 0 and 5 volts DC to the device. The set point voltage is proportional to the desired flow rate. For example, to achieve a flow rate of 40 liters per minute through mass flow controller 44 having a full scale output of 40 liters per minute, a set-point voltage of 5 V is applied. Similarly, a set-point voltage of 2.5 V will be applied to achieve a flow rate of 20 liters per minute. After calculating the desired flow rate which is desired for extraction of sample air 12, the BASIC program implemented in computer 40 sends commands to the digital-to-analog converter mounted in computer 40. The digital-to-analog converted sends out the appropriate set-point voltage to mass flow controller 44. Then mass flow controller 44 will instantaneously adjust to give the desired air flow.

The BASIC program also enables computer 40 to acquire, through the analog-to-digital converter in computer 40, voltage signals representing the temperature and pressure of the sample air exiting from sampling interface 22. These parameters are used in calculations that are performed later for normalizing the measured metal concentrations to dry standard conditions (70° F. and 29.29 inches of mercury pressure). This is done because it cannot be assumed that the temperature and pressure of sample air actually measured in the plasma are identical to the temperature and pressure of the flue gases after transport through transfer line 20 and sampling interface 22. The BASIC programs in computer 40 uses these acquired values along with a user-provided estimate of the moisture content of sample air to calculate a correction factor for later use. This factor is written to a data file by the BASIC program and the file is later read by the Thermospec™ Command Language program.

Along with this correction factor, the BASIC program also writes various parameters including flue gas velocity, temperature, and pressure, as well as, flow rate of extracted sample air, percent oxygen, sample air temperature and pressure to the same data file for archiving purposes.

The BASIC program also acquires a voltage via the analog-to-digital converter in computer 40 that represents the oxygen concentration in the extracted sample air. This measurement is obtained by process oxygen analyzer 46, such as a Model 410 marketed by Nova Analytical of Niagara Falls, N.Y. Analyzer 46 is located at the exhaust end of the sampling system at the exit of mass flow controller 44. The purpose of analyzer 46 is to measure the oxygen content of the sample air so that metal concentration values can ultimately (and automatically) be normalized to 7 percent oxygen. This allows an accounting for any deliberate or inadvertent dilution of the extracted flue gases by addition of dilution air or leakage of ambient air into the system, respectively. Accordingly, it provides a means by which metals concentrations from the source being measured can be compared with those of other sources.

After the flow rate of extracted sample air 12 has been automatically adjusted according to the measured flue gas parameters, it is held constant until the beginning of the next measurement cycle, approximately 60 seconds later, when new flue gas parameters are acquired and the flow rate of extracted sample air is readjusted. Faster rates of measurements of metal concentrations by continuous emissions monitoring are possible at more frequent intervals than once every 60 seconds. Thus, automated isokinetic sampling system 10 will accordingly, permit more frequent adjustments of the isokinetic sampling flow rate. However, provision also can be made in automated isokinetic sampling system 10 for adjustment of the sampling rate at frequencies different than the frequencies used for metal measurements.

A moisture condenser 45 removes moisture from the extracted stack air and is located downstream from the outlet of sampling interface 22 and upstream from vacuum pump 42. Condenser 45 is necessary to prevent moisture from condensing in vacuum pump 42 and mass flow controller 44. Such condensing would be deleterious to the operation of either, and would invalidate the process of mass flow measurement that is essential to accurate control of the flow rate of sample air. Condenser 45 presently used for moisture removal is a 30-ft length of ½ of an inch outer diameter copper tubing inserted within an equal length of polyethylene tubing of 1 inch outer diameter and ¾ of an inch inner diameter. Compression fittings are used to secure the copper tubing inside the polyethylene tubing and allow chilled water to circulate along the outside of the copper tubing to transfer heat away from the copper tubing thereby lowering its temperature to approximately 33°–35° F. Moisture in the sample air passing through the copper tubing is condensed on the inner walls of the copper tubing. The concentric tubing assembly is helically coiled so that condensed moisture can run downhill to a collection point where it can be removed through a pumped drain using a peristaltic pump. Air from which the bulk of the moisture has been removed then exits condenser 45 and enters vacuum pump 42.

Figure 2:
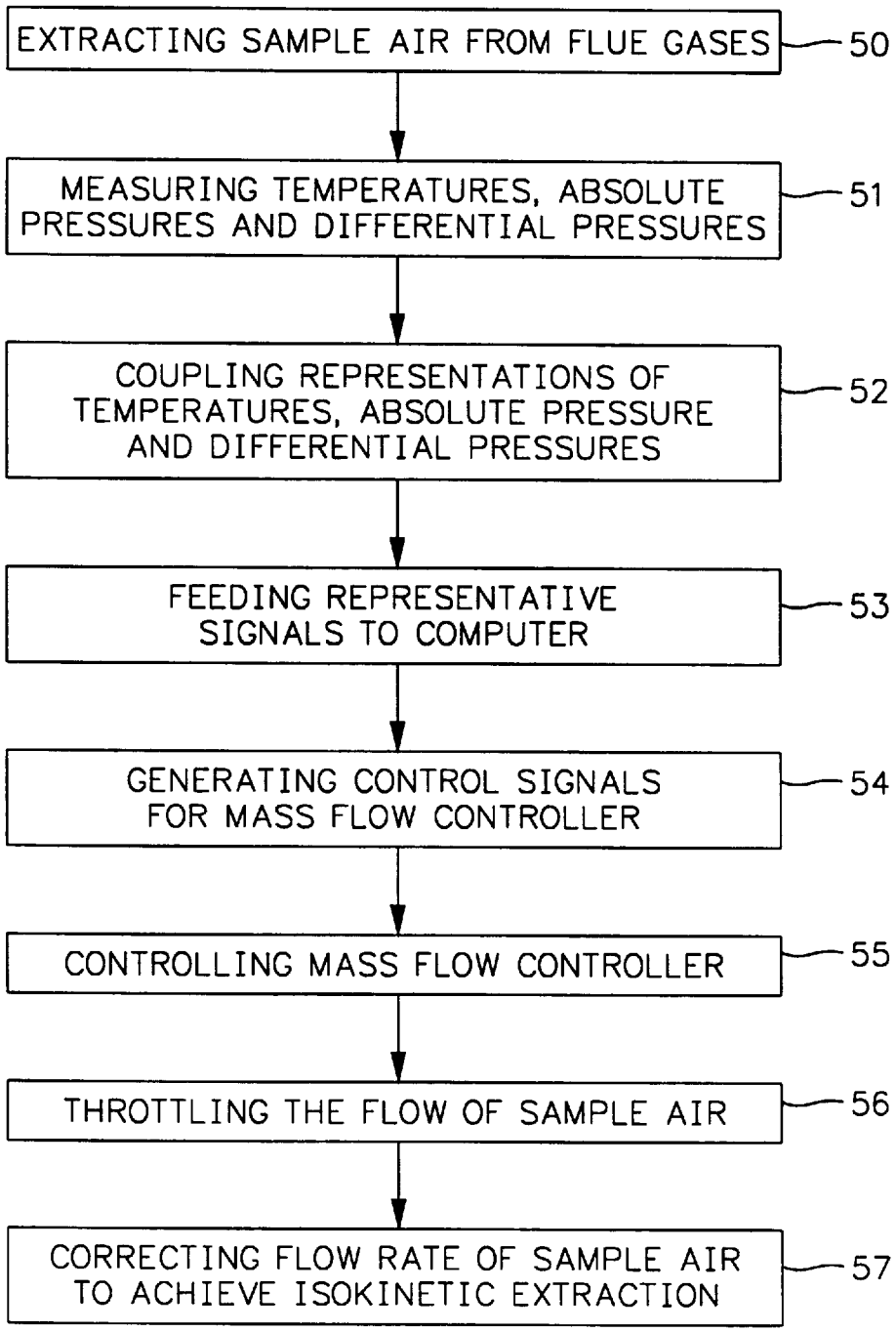
FIG. 2 is a flow diagram illustrating the method of the invention to establish continuous automated isokinetic sampling.

FIG. 2 of the drawings shows salient features of the automated process for prolonged isokinetic sampling of emissions in flue gases. Extracting 50 sample air from flue gases in the exhaust stack for a combustor uses a heated sampling probe 15. Sampling probe 15 has mounted on the end of it, sampling nozzle 16, of a precise inner diameter, thermocouple 17, to measure the air temperature in the stack, and an S-type pitot tube 19 assembly to gather readings representative of stack air differential pressure. Transducer 18 is for getting readings of absolute pressure. Measuring 51 temperatures, absolute pressures and differential pressures of the flue gases is done with thermocouple 17, transducer 18 and pitot tube 19, respectively. Coupling 52 representations of the temperatures, absolute pressures and differential pressures to microprocessor micromanometer 30 allows quantification of the differential pressures. Pitot tube 19 and thermocouple 17 are connected pneumatically and electrically, respectively, via umbilical assembly 27 to microprocessor micromanometer 30. Next, feeding 53 of signals representative of the temperatures, absolute pressures and quantified differential pressures to computer 40 allows a consequent generating 54 of control signals in computer 40 from the representative signals for a mass flow controller 44. The control signals from computer 40 assures controlling 55 of mass flow controller 44 that is located just downstream of vacuum pump 42. The controlling 55 of mass flow controller effects throttling 56 of the flow of sample air 12 through it. This throttling 56 results in correcting 57 the flow rate to a correct magnitude through mass flow controller 44 to achieve isokinetic extraction of sample air 12 under the existing stack conditions of temperature, pressure, and velocity at the point of extraction at nozzle 16 for the selected nozzle opening, or diameter. These stack conditions can vary over time and automated isokinetic sampling system 10 immediately can adjust the flow rate of mass flow controller 44 so that isokinetic sampling can continue uninterrupted and valid data can be generated by ICP-CEM 25.

In the aforedescribed system a specific flow rate (in liters per minute) is required to achieve a specific linear velocity (in meters per second) through a specific nozzle cross-sectional area (in meters squared). This flow of extracted air passes through sampling nozzle 16, heated sample probe 15, heated sample line 20, sampling interface 22, moisture condenser 45, vacuum pump 42, regulator 43, mass flow controller 44, oxygen analyzer 46 and out to exhaust.

Thus, as the velocity of stack air or flue gases varies over time, automated isokinetic sampling system 10 senses these changes and adjusts itself accordingly to maintain 100 percent isokinetic conditions throughout a prolonged monitoring period. No attending operator is necessary with automated isokinetic sampling system 10 of the invention. Reliability and accurate monitoring is thereby assured.

The invention herein described shares many hardware features with presently-used manual methods. A salient feature of this invention is that virtually all components are commercially available from appropriate vendors. However, it is the specific arrangement of these components and the approach to automation of these components as an integrated system that is truly unique. In most instances, the individual components are available from multiple manufacturers and the sources identified above are representative of typical sources of a product that can be used. Their suggestion as typical sources is not be interpreted as representing a specification or an endorsement. Items for which vendors are not identified are generic or more common off-the-shelf items.

The arrangements of the components and ducting of samples of the embodiment disclosed herein are not to be construed as limiting, but rather are intended for the purpose of demonstrating this inventive concept. Therefore, it is to be understood that, having the teachings of this invention in mind, one skilled in the art to which this invention pertains can select other components and/or arrangements of components and still be within the scope of this invention. Similarly, the flow rates, switching sequences, computer programming, plasma gases, etc. that were disclosed herein were selected for the purpose of demonstration of this invention. They are not intended to limit the applications and scope of this invention.

It should be readily understood that many modifications and variations of the present invention are possible within the purview of the claimed invention. It is therefore to be understood that within the scope of the appended claims the invention may be practiced otherwise than as specifically described.

I claim:

1. A method of automated isokinetic sampling of flue gases for a continuous monitor of metal emissions comprising the steps of:

extracting sample air from flue gases in the exhaust stack for a combustor with a heated sampling probe;

measuring temperatures, absolute pressures and differential pressures of said flue gases;

feeding signals representative of said temperatures, absolute pressures and differential pressures to a computer:

generating control signals in said computer based on said representative signals for a mass flow controller; and controlling said mass flow controller with said control signals to affect the flow of said sample air through said heated sampling probe and a sampling interface for said continuous monitor of metal emissions.

2. A method according to claim 1 further including the step of:

coupling representations of said temperatures, absolute pressures and differential pressures to a microprocessor micromanometer.

3. A method according to claim 2 further including the step of:

throttling said flow of said sample air through a vacuum pump.

4. A method according to claim 3 further including the step of:

correcting said flow rate to a magnitude through said mass flow controller to achieve isokinetic extraction of said sample air under the existing stack conditions of temperature, pressure, and velocity at the point of extraction of said sample air in said heated sampling probe.

5. A method according to claim 4 in which said step of extracting is done by a heated sampling probe having a sampling nozzle, a thermocouple to measure gas temperature, a pilot tube to measure differential pressures, and a transducer to measure absolute pressure.

6. A method according to claim 5 in which said microprocessor micromanometer quantifies said differential pressures.

7. An apparatus for automated isokinetic sampling of flue gases for a continuous monitor of metal emissions comprising:

means for extracting sample air from flue gases in the exhaust stack for a combustor with a heated sampling probe;

means coupled to said extracting means for measuring temperatures, absolute pressures and differential pressures of said flue gases;

means coupled to said measuring means for feeding signals representative of said temperatures, absolute pressures and differential pressures to a computer;

means coupled to said feeding means for generating control signals in said computer based on said representative signals and connecting them to a mass flow controller; and means coupled to said generating means for controlling the flow of said sample air through said heated sampling probe and a sampling interface for said continuous monitor of metal emissions.

8. An apparatus according to claim 7 further comprising:

means for coupling representations of said temperatures, absolute pressures and differential pressures to a microprocessor micromanometer.

9. An apparatus according to claim 8 in which said mass flow controller includes means for throttling said flow of said sample air through said vacuum pump.

10. An apparatus according to claim 9 in which said throttling means corrects said flow rate to a magnitude through said mass flow controller to achieve isokinetic extraction of said sample air under the existing stack conditions of temperature, pressure, and velocity at the point of extraction of said sample air in said heated sampling probe.

11. An apparatus according to claim 10 in which said extracting means includes a heated sampling probe having a sampling nozzle, thermocouple, and a pitot tube, and a transducer to provide representations of said temperatures, absolute pressures and differential pressures.

12. An apparatus according to claim 11 in which said microprocessor micromanometer quantifies said differential pressures.

* * * * *